(12) United States Patent
Offerle et al.

(10) Patent No.: US 8,845,889 B2
(45) Date of Patent: Sep. 30, 2014

(54) OIL RESERVOIR WITH BAFFLE

(75) Inventors: Timothy Gerard Offerle, Saline, MI (US); Todd Robert Miller, Ann Arbor, MI (US); Mike Lazzarotti, Northville, MI (US); Dahmane Alem, Ypsilanti, MI (US); Adam Wirth, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 13/273,264

(22) Filed: Oct. 14, 2011

(65) Prior Publication Data

US 2013/0092611 A1  Apr. 18, 2013

(51) Int. Cl.
*F15B 1/26* (2006.01)
*B01D 35/147* (2006.01)
*B01D 35/027* (2006.01)
*B01D 29/23* (2006.01)
*F15B 21/04* (2006.01)
*F01M 1/10* (2006.01)
*F01M 11/03* (2006.01)
*F01M 11/04* (2006.01)

(52) U.S. Cl.
CPC .......... *F15B 1/26* (2013.01); *F01M 2001/1092* (2013.01); *B01D 35/147* (2013.01); *B01D 29/232* (2013.01); *F15B 21/041* (2013.01); *F01M 2011/031* (2013.01); *B01D 35/027* (2013.01); *F01M 2011/0491* (2013.01)
USPC ..... 210/130; 210/247; 210/172.1; 210/172.6; 137/574; 137/576

(58) Field of Classification Search
CPC ................................................... F15B 21/041
See application file for complete search history.

(56) References Cited

U.S. PATENT DOCUMENTS 6,913,040 B2 * 7/2005 Crossman et al. ............ 137/587
2002/0121473 A1 * 9/2002 Boast et al. ................... 210/450

* cited by examiner

*Primary Examiner* — Terry Cecil
(74) *Attorney, Agent, or Firm* — Joseph E. Root

(57) ABSTRACT

An oil filter reservoir includes a reservoir housing having a filter, which divides the housing into an oil inlet chamber and an oil outlet chamber. A housing inlet and a housing outlet circulate oil in and out of the reservoir housing. The filter includes a permeable wall and a bypass valve, which releases the increased oil pressure and volume in the inlet chamber during cold temperature operation. A baffle in the outlet chamber is spaced apart from the bypass valve and permits limited oil flow through the baffle. The baffle separates the outlet chamber into a reserve chamber and a bypass chamber.

6 Claims, 3 Drawing Sheets

OIL RESERVOIR WITH BAFFLE

TECHNICAL FIELD

This application relates generally to oil filter reservoirs, and more particularly, to oil filter reservoirs including bypass valves.

BACKGROUND

Hydraulic machines utilize fluid power for performing simple as well as heavy duty tasks. Pressurized hydraulic fluid, i.e., oil, is transmitted throughout the machine to various hydraulic pumps, valves, and motors to drive the machine. The power steering and power brakes in vehicles, and the power train in construction equipment, are examples of hydraulic systems in such machines.

Filters are incorporated into most hydraulic systems for removing metal particles from the oil, along with other contaminants. Blockage of the filter creates a restriction to hydraulic fluid flow, leading to pump noise and other problems. Further, during cold temperature working conditions, hydraulic fluid becomes more viscous, which increases the amount of resistance to flow in the reservoir. The hydraulic pump works harder to draw this more viscous fluid. The colder temperatures also increase the number of air bubbles in the fluid, and this affects the hydraulic pump, resulting in noisy operation. Most filters incorporate valves to ease hydraulic fluid pressure inside the filter during cold temperature operations. In practice, these valves have met with little success, and have caused increased noise at low temperature operation.

Thus a need exists for a hydraulic filter with mechanisms for improving cold temperature operations of hydraulic pumps.

SUMMARY

An aspect of the disclosure sets out an oil filter reservoir including a reservoir housing having a filter, a housing inlet, a housing outlet, and a baffle. The filter divides the reservoir housing into an oil inlet chamber and an oil outlet chamber having the housing inlet and the housing outlet respectively. The filter includes a permeable wall and a spring loaded bypass valve. The bypass valve allows a portion of the oil to bypass the permeable wall to release the increased oil pressure and volume in the inlet chamber. The baffle is present in the outlet chamber, spaced apart from the bypass valve, and includes openings to permit a limited oil flow through the baffle. The baffle further separates the outlet chamber into a reserve chamber and a bypass chamber. Further, the bypass chamber includes the housing outlet and receives oil from the bypass valve.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes an oil filter reservoir adapted to be used in a hydraulic system, under normal operation, as well as cold operating conditions. To this end, the oil reservoir includes a filter and a baffle. The filter having a permeable wall and bypass valves, divides the reservoir housing into an inlet and an outlet chamber with a housing inlet and a housing outlet respectively. Under normal temperature conditions, oil enters the inlet chamber through the housing inlet, permeates the filter walls, enters the outlet chamber, and exits the reservoir housing via the housing outlet. The baffle is positioned spaced apart from the filter, divides the outlet chamber into a reserve chamber and a bypass chamber. The baffle includes openings permitting limited oil flow there through, and a wall extending into the bypass chamber. Under cold temperature conditions, high pressure buildup in the inlet chamber prompts a bypass valve to release oil from the inlet chamber into the bypass chamber. The baffle wall prevents oil from entering the reserve chamber and encourages oil flow towards the housing outlet.

Exemplary Embodiments

Figure 1:
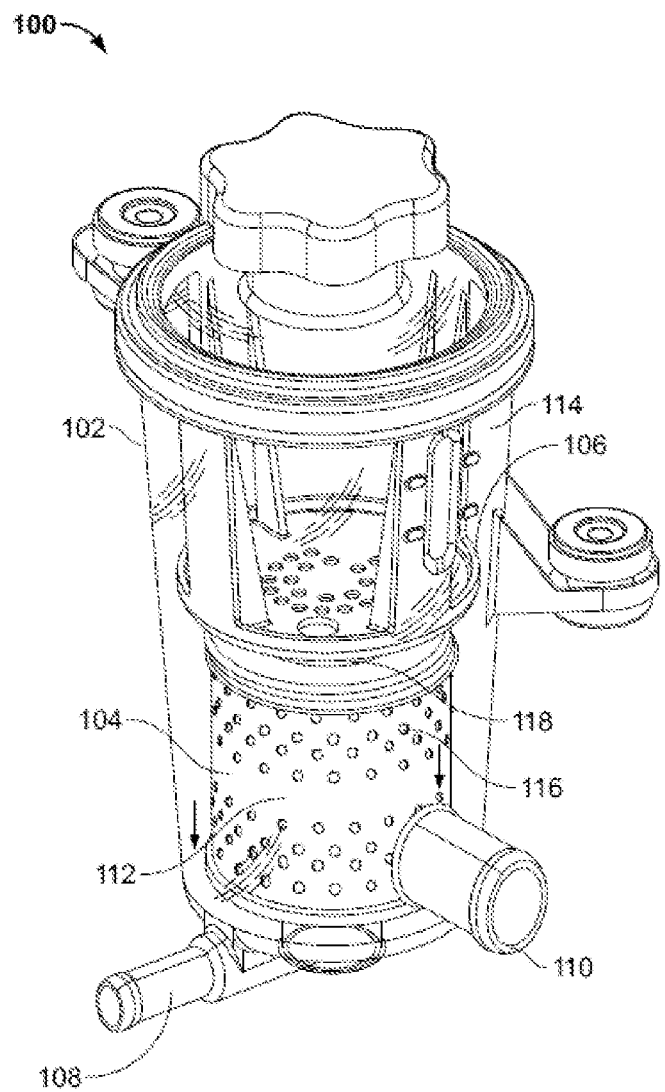
FIG. 1 depicts an oil reservoir with filter and baffle, according to an exemplary embodiment of the present disclosure.

FIG. 1 depicts an oil reservoir system 100, according to an embodiment of the present disclosure. The system 100 includes a reservoir housing 102 including a filter 104, a housing inlet 108, a housing outlet 110, and a baffle 106.

As depicted, the housing inlet 108 allows oil into the reservoir housing 102 and the housing outlet 110 removes oil from the reservoir housing 102. In another embodiment (not shown), the housing reservoir 102 may have more than one housing inlet and outlet. Housing inlet 108 and housing outlet 110 may have any of a number of cross sections and dimensions. For example, the inlet 108 and outlet 110 may be generally circular in cross section. Alternatively, as would be evident to a person skilled the art, the inlet 108 and outlet 110 may have a different suitable cross section, such as a rectangular cross section.

Filter 104 placed inside the reservoir housing 102 divides it into an oil inlet chamber 112 and an oil outlet chamber 114. The housing inlet 108 and the housing outlet 110 are in communication with the oil inlet chamber 112 and the oil outlet chamber 114, respectively. Filter 104 has a permeable wall 116, and a bypass valve 118. Oil entering the housing reservoir 102 from the housing inlet 108 enters the filter 104. Filter 104 allows circulating oil to pass through the filter, but blocks contaminants.

A bypass valve 118 located in a wall of the filter 104 releases oil directly into the outlet chamber 114 for easing increased pressure and volume in the inlet chamber 112, bypassing the filter 104's permeable wall. The bypass valve 118 may be spring loaded bypass valve. The spring means can be a coil spring or other known resilient device. Alternative bypass valve 118 designs would be evident to a person skilled in the art. For example, the bypass valve 118 may be a reed type valve. As illustrated, filter 104's shape and dimensions may correspond with the reservoir shape. Other filter design and configurations would be evident to a person skilled in the art.

Figure 2:
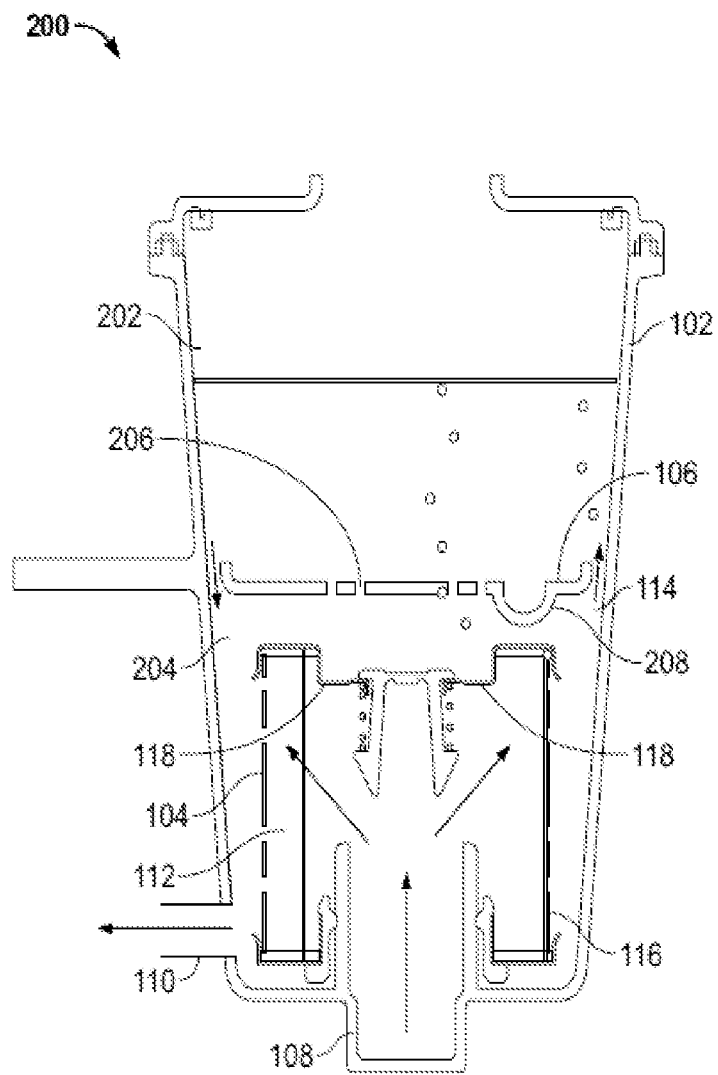
FIG. 2 is a cross-sectional view of the hydraulic reservoir of FIG. 1 under normal operating conditions.

As depicted in FIG. 1, baffle 106 is placed inside the outlet chamber 114, positioned spaced apart from the filter 104. The baffle 106 separates the outlet chamber 114 further into a reserve chamber 202 and a bypass chamber 204, as shown in FIG. 2. The baffle 106 includes openings 206 that allow excess oil and air bubbles to pass into the reserve chamber 202 from the bypass chamber 204. The baffle 106 has openings 206 present on either side of the baffle wall 208. The baffle 106 also includes a wall 208 extending into the bypass chamber 204. The wall 208 encourages viscous oil released from the bypass valve 118 into the bypass chamber 204 to move towards the housing outlet 110, instead of the reserve chamber 202, under cold operating conditions. This is due to the fact that the cold thickened oil is less likely to flow around the wall 208, and reach the openings on the other side of the wall 208, then warmer oil. Further, during system warm up, the baffle wall 208 helps to segregate excess oil in the reserve chamber 202 from the housing outlet 110, thus decreasing the amount of oil in circulation. With less oil in circulation, the oil in the hydraulic system warms more quickly. The baffle wall may have any suitable dimension and cross section. As depicted, the wall has a u-shaped cross section. Other cross-sections would be evident to persons of ordinary skill in the art, The dimensions and configurations of reservoir housing 102 may vary according to application. For example, heavy equipment requires larger reservoirs. Any other reservoir design would be evident to a person of ordinary skill in the art. Alternatively, a smaller reservoir design, for example, in vehicular applications, may include dynamic flow channels (not shown) on the fluid's return path. The reservoir housing 102, and the baffle 106, are manufactured from nylon 6,6. As would be evident to a person of skill in the art, other suitable materials may be utilized for manufacturing the reservoir and the baffle.

FIG. 2 is a cross-sectional view of the hydraulic reservoir of FIG. 1, with solid arrows depicting oil flow 200 under normal operating conditions. The reservoir housing 102 and related components have been described in relation to FIG. 1, and perform similar functions. As depicted, oil enters into the inlet chamber 112 through the housing inlet 108 and permeates through the filter walls 116 to enter the bypass chamber 204. Excess filtered oil rises up in the outlet chamber 114 and comes in contact with baffle 106's wall. The openings in the baffle 106 allow air bubbles and excess oil to move up into reserve chamber 202. Under normal operating temperature, oil circulates between the reserve chamber 202 and the bypass chamber 204, as depicted, and then finally enters housing outlet 110. Baffle 106 helps to restrict the amount of oil near the housing outlet 110, to prevent air from entering the housing outlet 110, during operation.

Figure 3:
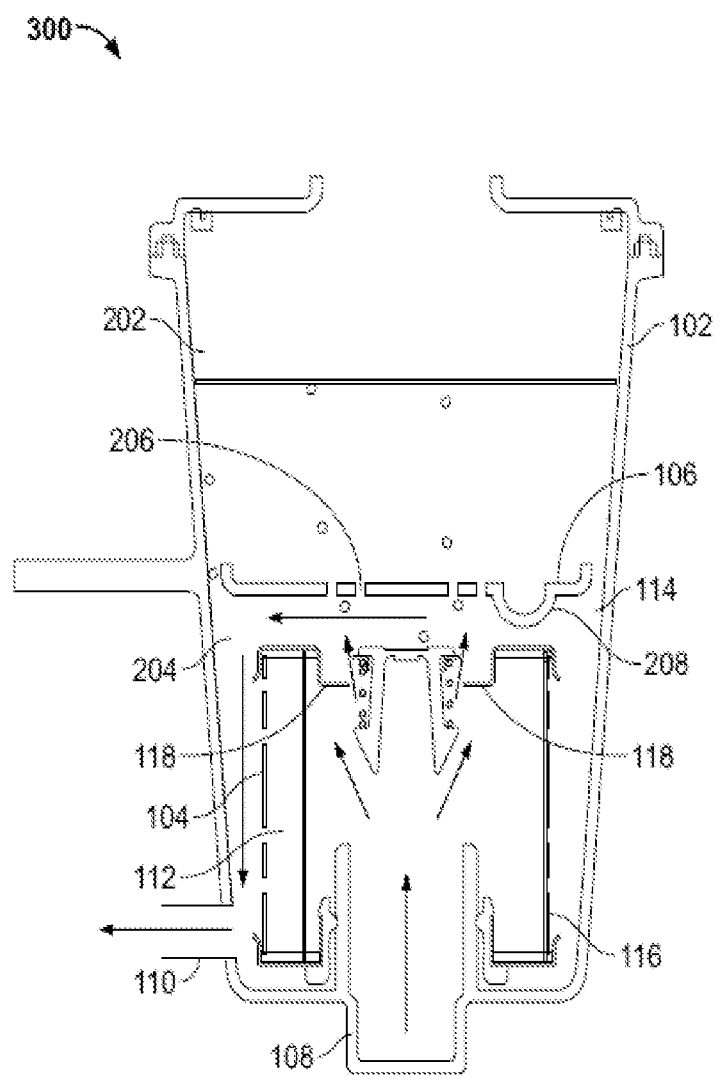
FIG. 3 is a cross-sectional view of the hydraulic reservoir of FIG. 1 under cold temperature operating conditions.

FIG. 3 also depicts a cross-sectional view of the reservoir housing 102 of FIG. 1. Solid arrows depict oil flow 300 under cold temperature operating conditions, for example, during start up in cold weather. The oil has a more viscous consistency than under normal operating conditions. The oil enters into the inlet chamber 112 through the housing inlet 108, but cannot as readily permeate filter wall 116, as under normal operating temperatures, leading to a higher pressure and greater volume inside the filter 104, than under normal operating temperatures. The spring-loaded bypass valve 118 opens up automatically under these conditions to discharge oil into the bypass chamber 204, to release this pressure buildup. The baffle 208 discourages this more viscous oil from rising through openings 206, thus encouraging oil flow towards the housing outlet 110. During system start, the baffle 106 decreases hydraulic fluid in circulation by segregating cold fluid in the reserve chamber 202 from the bypass chamber 204, thus decreasing oil volume in circulation, till the oil warms up.

The specification sets out a number of specific exemplary embodiments, but those skilled in the art will understand that variations in these embodiments will naturally occur in the course of implementing the subject matter of the disclosure in specific environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. An oil filter reservoir comprising:
   a reservoir housing, having a generally circular cross-section;
   a filter disposed generally concentrically within the housing, the filter and the housing defining an oil inlet chamber within the filter, a reserve chamber above the filter, and an oil outlet chamber between the filter and an inner wall of the housing;
   a housing inlet in communication with the inlet chamber;
   a housing outlet in communication with the outlet chamber, positioned adjacent a lower end of the filter;
   the filter including
      an upper end and the lower end;
      a permeable wall, generally cylindrical in form, spaced from the housing inner wall, the permeable wall facilitating an oil flow between the inlet chamber and the outlet chamber; and
      a spring loaded bypass valve positioned generally over the filter upper end remote from the housing inlet, the bypass valve opening in response to increased oil pressure in the inlet chamber; and
   a baffle in the reserve chamber, positioned directly above the filter, the baffle including openings permitting limited oil flow, the baffle being spaced apart from the bypass valve, the baffle defining a bypass chamber between the baffle and the upper end of the filter, the housing outlet and the bypass valve being in fluid communication with the bypass chamber;
   wherein the bypass valve facilitates an oil flow from the inlet chamber to the bypass chamber and to the outlet chamber without passing through the baffle and wherein the oil filter reservoir facilitates deaeration of the oil.

2. The oil filter of claim 1, wherein the baffle includes a wall extending into the bypass chamber, with some baffle openings being on one side of the wall, and other baffle openings being on another side of the wall, the wall limiting oil access to the baffle openings on the other side of the wall so that more viscous oil is encouraged to flow out of the housing outlet.

3. The oil filter of claim 2, wherein the baffle wall has a u-shaped cross section.

4. The oil filter of claim 1, wherein the filter is secured in the reservoir housing.

5. The oil filter of claim 1, wherein the baffle is secured in the reservoir housing.

6. The oil filter of claim 1, wherein the baffle is fabricated from nylon 6,6.

* * * * *